United States Patent

Tsuge et al.

[11] Patent Number: 5,966,071
[45] Date of Patent: *Oct. 12, 1999

[54] POWER WINDOW WITH DETECTING FUNCTION OF STICKING OF FOREIGN MATTER

[75] Inventors: Noboru Tsuge, Kariya; Takeshi Tanaka; Tomoyuki Kikuta, both of Toyohashi; Hidenori Ishihara, Hamamatsu, all of Japan

[73] Assignee: Asmo Co., Ltd., Shizuoka-pref, Japan

[*] Notice: This patent is subject to a terminal disclaimer.

[21] Appl. No.: 09/070,019

[22] Filed: Apr. 30, 1998

Related U.S. Application Data

[62] Division of application No. 08/697,418, Aug. 23, 1996, Pat. No. 5,754,017.

[30] Foreign Application Priority Data

Dec. 26, 1995 [JP] Japan ..................................... 7-339540
Jan. 26, 1996 [JP] Japan ..................................... 8-012098

[51] Int. Cl.⁶ ...................................................... B60J 1/08
[52] U.S. Cl. .......................... 340/438; 340/545; 318/257; 318/266; 318/434; 318/469; 49/26; 49/28
[58] Field of Search ..................................... 340/438, 540, 340/545; 318/257, 266, 434, 469; 49/26, 28

[56] References Cited

U.S. PATENT DOCUMENTS

| | | | |
|---|---|---|---|
| 5,187,381 | 2/1993 | Iwasa et al. ............................ | 340/438 |
| 5,404,673 | 4/1995 | Takeda et al. ............................. | 49/28 |
| 5,459,962 | 10/1995 | Bonne et al. .............................. | 49/28 |
| 5,483,135 | 1/1996 | Parks ........................................ | 318/469 |
| 5,621,293 | 4/1997 | Heller et al. ............................. | 318/466 |
| 5,661,385 | 8/1997 | McEwan .................................. | 340/552 |
| 5,754,017 | 5/1998 | Tsuge et al. ............................. | 318/286 |
| 5,774,046 | 6/1998 | Ishihera et al. .......................... | 347/438 |

FOREIGN PATENT DOCUMENTS 2 268 644  1/1994  United Kingdom.

OTHER PUBLICATIONS

Patent Abstracts of Japan, vol. 095, No. 004, May 31, 1995, JP 07 004137.

*Primary Examiner*—Edward Lefkowitz
*Attorney, Agent, or Firm*—Burns, Doane, Swecker & Mathis, L.L.P.

[57] ABSTRACT

To improve the detection reliability in the detection of sticking of a foreign matter and minimize a sticking load, a power window is provided with a window frame sensor disposed along the inner peripheral edge of a window frame and a drive motor for advancing and retreating a window glass in accordance with an external signal. A control circuit makes a duty control for a transistor to decrease the operating speed of the window glass when the pressure detected by the window frame sensor becomes larger than a predetermined value during a closing operation of the window glass. Thereafter, when the drive load of the drive motor exceeds a predetermined value, a relay is switched over to operate the window glass reverse in the opening direction.

9 Claims, 8 Drawing Sheets

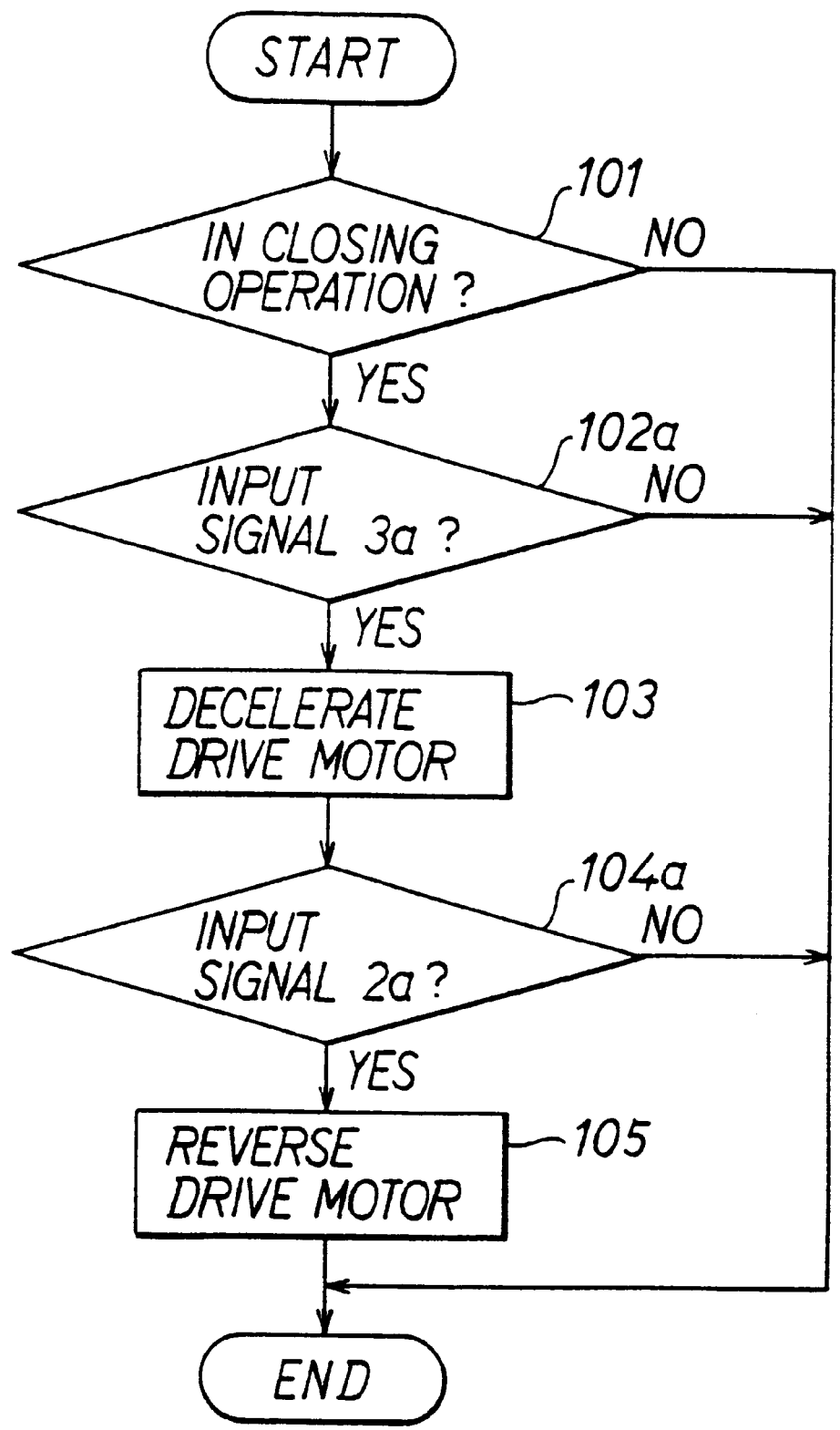

FIG.4A
FIG.4B
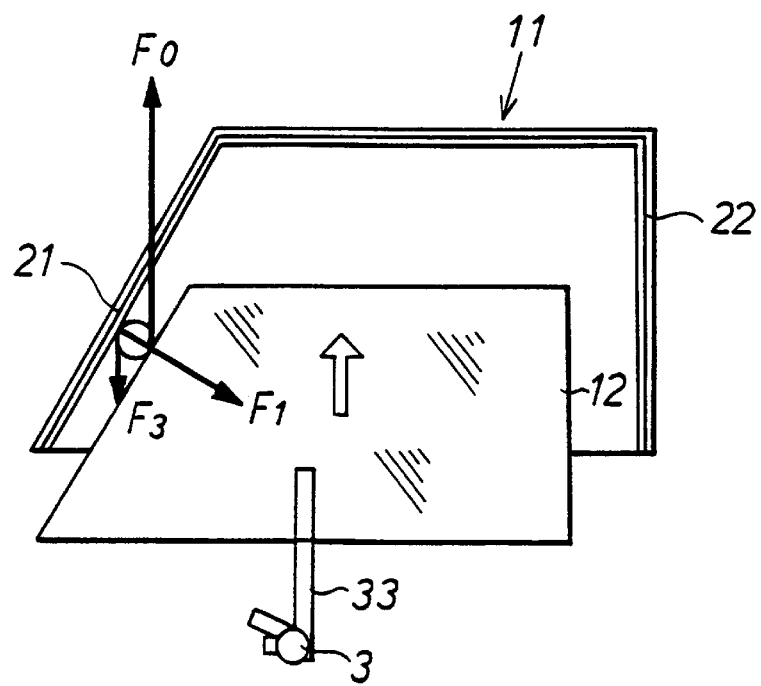
FIG.5

POWER WINDOW WITH DETECTING FUNCTION OF STICKING OF FOREIGN MATTER

This application is a divisional of application Ser. No. 08/697,418, filed Aug. 23, 1996 now U.S. Pat. No. 5,754,017.

BACKGROUND OF THE INVENTION

1. Field of the invention

The present invention relates to a power window and more particularly to a power window for use in a vehicular window or the like which power window can prevent sticking of a foreign matter in the vehicular window.

2. Description of Related Art

The number of vehicles equipped with a power window is increasing, which utilizes the driving force of a motor whereby a light touch to an operating switch permits easy opening or closing of the window glass of a door the like. However, when the window glass of a rear seat door is to be opened or closed with an operating switch provided near the driver's seat, the driver sometimes does not become aware of a foreign matter being caught in the window glass due to the presence of a dead angle.

In view of the above point there has been tried to provide a power window with a sticking sensor to prevent sticking of a foreign matter in the window glass of a vehicular door. For example, in JP-A-7-4137, there is disclosed a device which detects the sticking of a foreign matter on the basis of both a detected signal from a window frame sensor, e.g. tape switch, disposed along the peripheral edge of a window frame and a lock signal based on overload of a drive motor.

According to the sticking detecting device disclosed in the above publication, both window frame sensor and locking of the drive motor are used to prevent a malfunction caused by mischief or the like and thereby improve the reliability of detection. However, with the recent spread of the power window, it is desired to further improve the reliability.

Further, the detection sensitivity of a window frame sensor is relatively high [about 5 N (newton) or more], while the detection sensitivity for a drive motor overload is relatively low (about 40 N or more), so by merely taking an AND condition of the detection using a window frame sensor and that using a drive motor there arises the problem that a fairly large sticking force is already exerted even if the window glass is started to operate in the reverse direction, or opening direction, at the time of detection.

SUMMARY OF THE INVENTION

An object of the present invention is to provide a power window, which can improve the detection reliability in detecting the sticking of a foreign matter.

Another object of the present invention is to provide a power window, which can minimize a sticking load when a foreign matter is stuck.

According to the first aspect of the present invention, a control circuit outputs a command signal to a motor reversing circuit to reverse a drive motor when an external force detected by a window frame sensor exceeds a first predetermined value and when a drive load detected by a load detecting sensor exceeds a second predetermined value only during a closing operation of a window body.

Accordingly, there is no possibility of malfunction of the power window due to mischief or the like at any other time than the closing operation of the window body, and it is possible to surely detect only sticking of a foreign matter and operate the window body in the opening direction.

According to another aspect of the present invention, the control circuit outputs a command signal to decrease an operating speed of the window body when the external force detected by the window frame sensor exceeds the first predetermined value, and thereafter outputs a command signal to the motor reversing circuit to reverse the drive motor when the drive load detected by the load detecting sensor exceeds the second predetermined value.

Since the operating speed of the window body is decreased when the external force detected by the window frame sensor exceeds a first predetermined value, the drive motor can immediately reverse when the command signal to reverse the drive motor is outputted to the motor reversing circuit and a sticking load on a foreign matter can be reduced.

According to a still another aspect of the present invention, control circuit outputs a command signal to stop the closing operation of the window body during the closing operation of the window body, when an external force detected by the window frame sensor exceeds a first predetermined value and when a working angle between a position of a window frame on which the external force is exerted and a direction of closing the window body is less than a predetermined working angle, and further outputs a command signal to stop the closing operation of the window body during the closing operation of the window body, when a drive load detected by the load detecting sensor exceeds a second predetermined value and when the working angle is greater than the predetermined working angle.

Since the foreign matter sticking is determined on the basis of the external force detected by the window frame sensor without taking the drive load detected by the load detecting sensor into account when the working angle is less than the predetermined working angle, the determination in question is free from error. Thus, as compared with the case where the determination is made on the basis of a signal with a large proportion of detection error occupied therein, the foreign matter sticking determination becomes more certain and the occurrence of a malfunction such as, for example, the window closing operation being not stopped even with the foreign matter caught in the window body is decreased.

BRIEF DESCRIPTION OF THE DRAWINGS

Additional objects and advantages of the present invention will be more readily apparent from the following detailed description of preferred embodiments thereof when taken together with the accompanying drawings in which:

FIGS. 3A, 3B and 3C are operation flowcharts of a control circuit in the second embodiment;

FIGS. 4A and 4B are operation timing charts in the second embodiment;

FIG. 5 is a partial schematic view of the third embodiment of the present invention;

DETAILED DESCRIPTION OF PREFERRED EMBODIMENTS

Embodiments of the present invention will be described hereinafter with reference to the drawings.

(First Embodiment)

Figure 1:
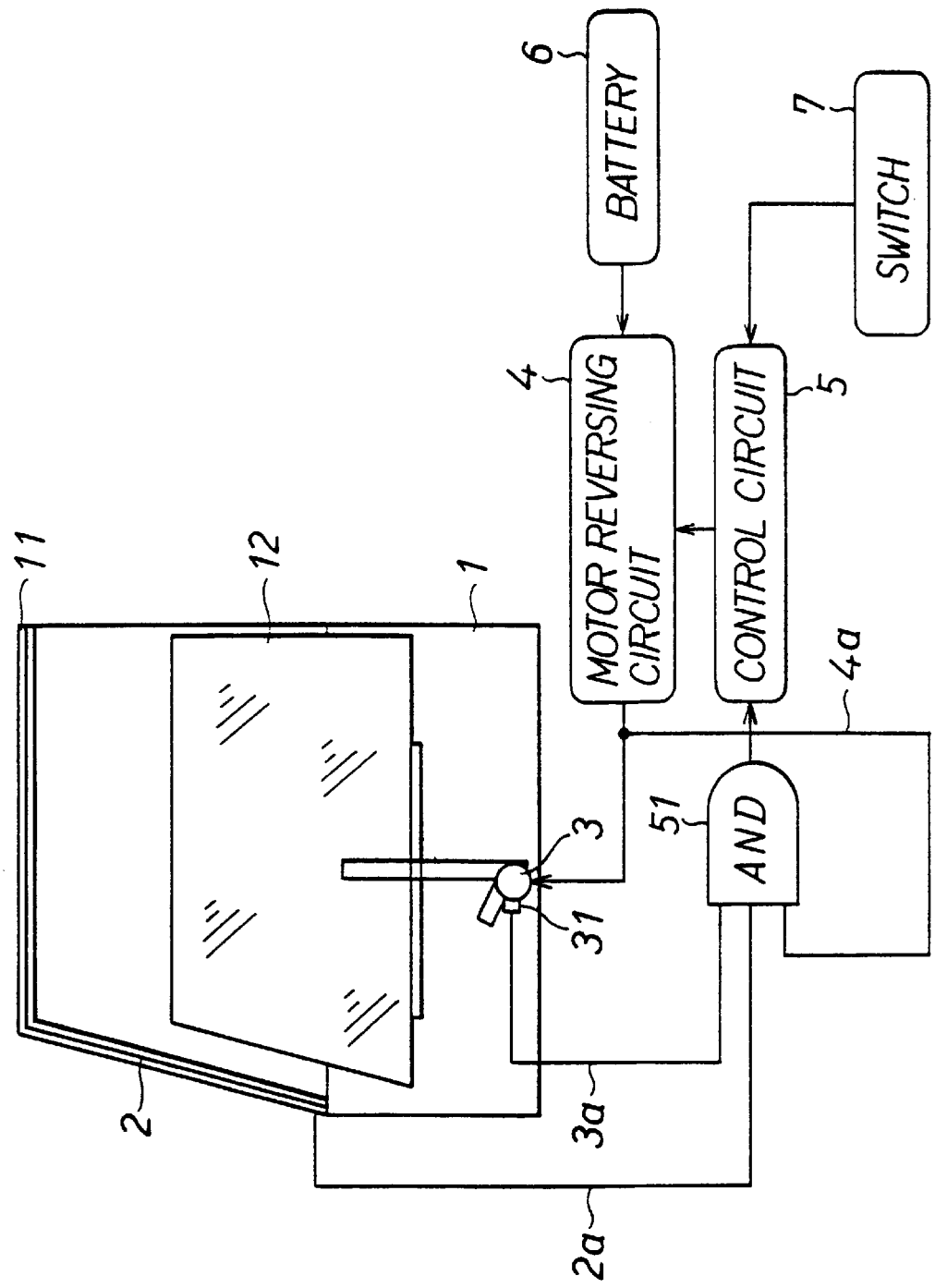
FIG. 1 is a block diagram of a power window according to the first embodiment of the present invention.

FIG. 1 illustrates an entire construction of a power window according to the first embodiment of the present invention. In FIG. 1, a drive motor 3 for moving a window glass 12 up and down is mounted in a vehicular door 1. Forward and reverse rotations of the drive motor 3 are effected by changing the polarity of voltage supplied to a motor terminal by means of a motor reversing circuit 4. When a value detected by a rotation sensor 31 attached to the drive motor 3 is below a predetermined value, an overload signal 3a is generated from the drive motor 3 and fed to an AND gate 51.

A window frame sensor 2 is disposed along upper and front sides of a window frame 11 of the vehicular door 1. For example, the window frame sensor 2 comprises an insulating rubber tube having flexibility and electrodes formed of an electrically conductive rubber and disposed longitudinally in opposed positions on the inner peripheral surface of the tube. When an external force larger than a predetermined value is applied to the rubber tube, the tube is deformed and the opposed electrodes come into contact and conduction with each other to produce a window force signal 2a. The window force signal 2a obtained by the window frame sensor 2 is fed to the AND gate 51.

A window-closing ON signal 4a is fed to the AND gate 51. For example, the signal 4a is generated when the motor is in forward rotation (closing direction of the window glass) in accordance with the polarity of the motor terminal.

An output signal from the AND gate 51 is fed to a control circuit 5. The control circuit 5 causes the motor reversing circuit 4 to operate in accordance with a command provided from an operating switch 7. The motor reversing circuit 4 transmits a DC voltage from a battery 6 to the drive motor 3 while switching the polarity thereof from one to the other, thereby causing the motor 3 to rotate forward and reverse.

When an output signal is fed to the control circuit 5 from the AND gate 51, that is, when the motor overload signal 3a and the window force signal 2a are generated while the window is in its closing operation, the control circuit 5 outputs a command signal to the motor reversing circuit 4 to rotate the drive motor 3 in the reverse direction (the window glass opening direction), whereby it is possible to prevent a foreign matter from being caught in the window glass 12.

According to this embodiment, since the outputs of the motor overload signal and that of the window force signal are confirmed only during the closing operation of the window glass, there is no malfunction being caused by mischief or the like and hence it is possible to surely prevent a foreign matter from being caught in the window glass.
(Second Embodiment)

Figure 2:
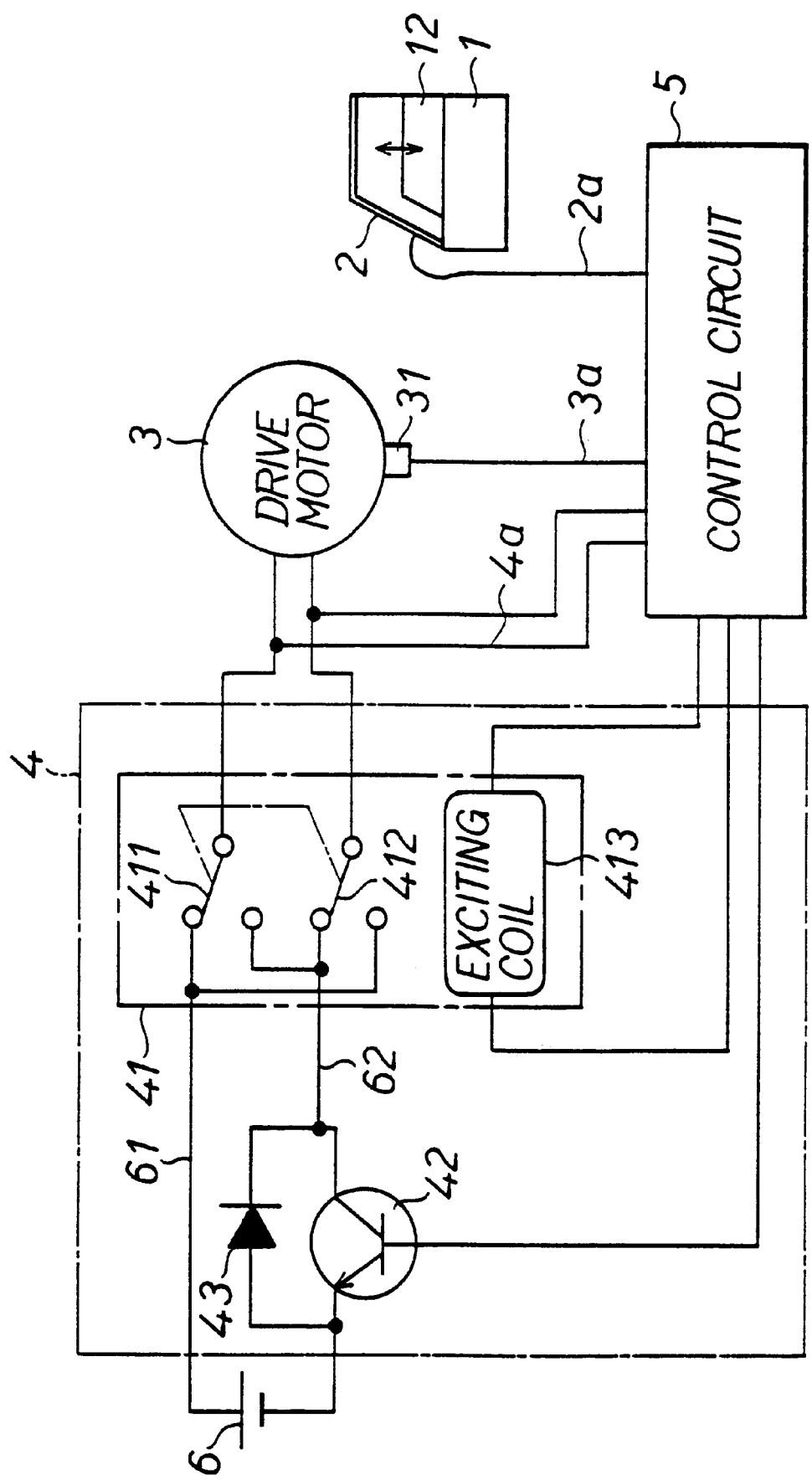
FIG. 2 is a circuit diagram of a power window in the second embodiment of the present invention.

In FIG. 2, the window-closing ON signal 4a, motor overload signal 3a and window force signal 2a are fed directly to the control circuit 5. In the motor reversing circuit 4, a motor reversing relay 41 and a transistor 42 with a diode 43 connected thereto in parallel are provided in feeder lines 61 and 62 extending from the battery 6.

The motor reversing relay 41 is a 2C type relay having a pair of interlocked double-throw contacts 411 and 412, which are positioned in the feeder lines 61 and 62, respectively. In the illustrated state with no electric current supplied to an exciting coil 413 from the control circuit 5, a positive voltage is applied to the drive motor 3 to rotate the motor 3 in the forward direction (the window glass closing direction). Subsequent supply of an electric current to the exciting coil 413 causes change-over of the double-throw contacts 411 and 412 to apply a reverse voltage to the drive motor 3, whereby the motor 3 is rotated in the reverse direction (window glass opening direction). The transistor 42 conducts in response to 0–100% duty pulse signals provided from the control circuit 5 to adjust the supply current to the drive motor 3, thereby changing the rotating speed of the motor 3.

Figure 3A:
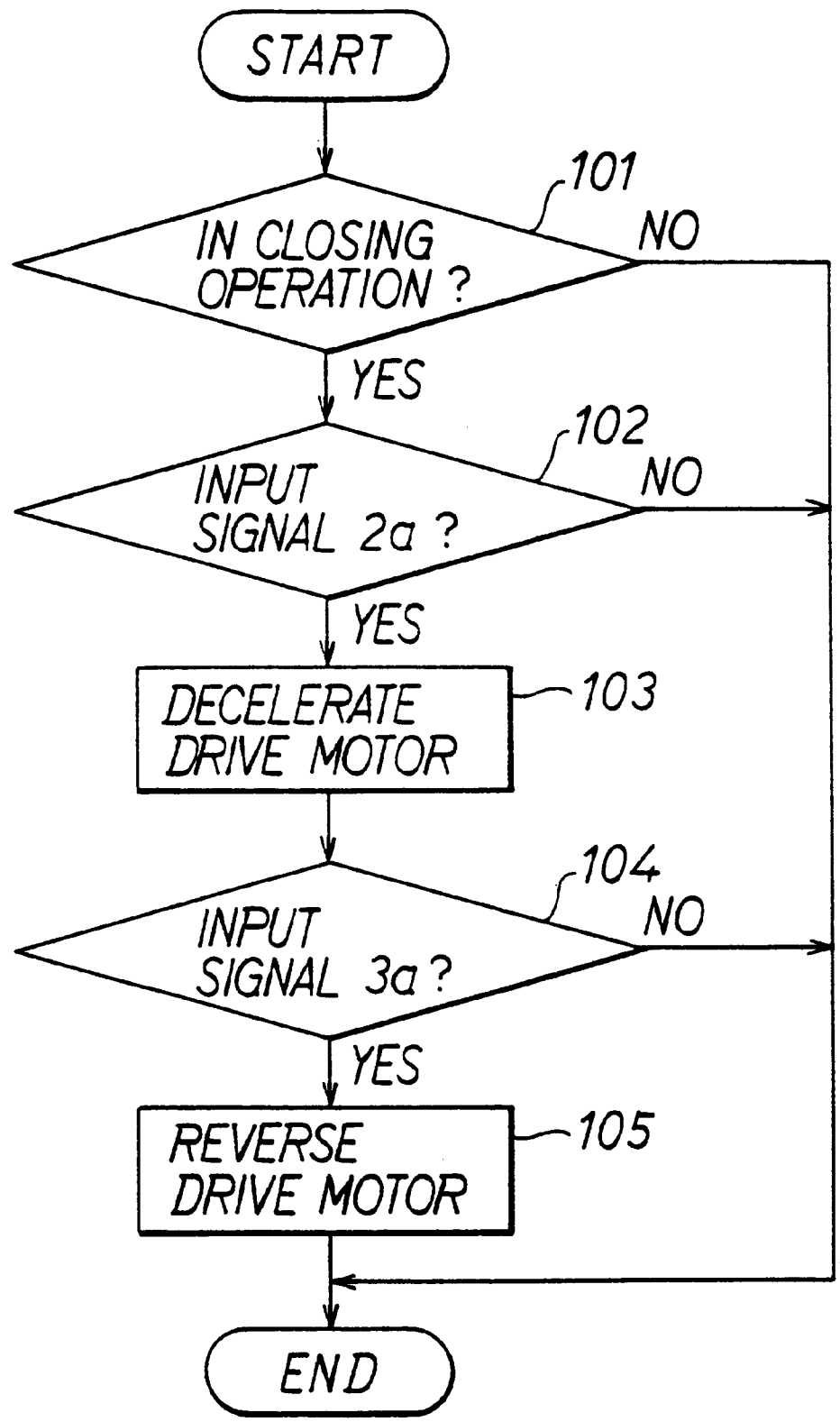

The operation of the control circuit 5 for preventing the sticking of a foreign matter will be described below on the basis of the flowchart of FIG. 3A and with reference to FIGS. 4A and 4B.

In step 101, a check is made to see if the window glass 12 is in its closing operation. During this closing operation, the transistor 42 is placed in the state of 100% conduction (area A in FIG. 4A) and the relay 41 is changed over to the forward-rotation side of the motor (area A in FIG. 4B). In this state, upon input of the window force signal 2a (step 102) at a timing $T_1$, the ON duty ratio of the transistor 42 becomes smaller gradually (area B in FIG. 4A) and the drive motor 3 is decelerated (step 103). Consequently, the closing (rising) speed of the window glass 12 decreases.

In this state, upon input of the drive motor overload signal 3a (step 104) at a timing $T_2$, the relay 41 is immediately switched over to the motor reverse-rotation side (area C in FIG. 4B and at the same time the transistor 42 turns to 100% conductive state (area C in FIG. 4A). As a result, the drive motor 3 starts reverse-rotation at once (step 105), causing the window glass 12 to move down rapidly.

Thus, during the closing operation (rising) of the window glass 12, the rising speed of the window glass 12 is decreased at the stage where the signal 2a is outputted from the window frame sensor 2 having a high detection sensitivity, and upon subsequent overload of the drive motor 3 the window glass 12 is reversed in the descending direction, so that the window glass 12 can be moved in the opening direction promptly before exertion of a large sticking force on the window glass.

Since the forward-reverse change-over and rotating speed control for the drive motor 3 are performed by the motor reversing relay 41 and a single transistor 42, the motor reversing circuit 4 can be simplified in structure and reduced in cost in comparison with a conventional H bridge circuit for forward and reverse rotation having four transistors and used frequently heretofore; besides, circuit loss can also be reduced. Further, since the transistor 42 has a constant-current characteristic, it is possible to realize slow starting and the like of the drive motor 3.

While the motor reversing relay 41 is ON in the normal window opening and closing operation, the transistor 42 is rendered OFF beforehand as in area D in FIG. 4A, so the occurrence of an arc when the relay is switched over at a timing $T_3$ can be prevented, thus permitting the use of a relay smaller in both size and capacity; besides, the service life of its contacts becomes longer.

For detecting an overload of the drive motor 3, there may be detected a motor torque or a motor current.

The window frame sensor 2 may be substituted by any other pressure sensor. For example, there may be used a pressure sensor which produces an output signal proportional to the magnitude of an external force, and in this case the control circuit 5 determines if the level of such output signal exceeds a predetermined value.

As the motor reversing relay 41, the 2C contact type used above may be substituted by two 1C contact type relays. In this case, the 1C contacts are operated each independently and it is possible to control the motor by short-circuit at both ends.

In place of the transistor 42 there may be used an IGBT or the like. The deceleration of the drive motor may be done not only by duty control for the transistor 42 but also by limiting the motor current using a resistor.

Although in the second embodiment described above the drive motor begins to slow down when an external force larger than a predetermined value has been detected by the window frame sensor and upon subsequent overload of the drive motor the motor begins to rotate reverse. Conversely, as shown in FIG. 3B, the deceleration of the drive motor may be started upon detection of the overload of the motor in step 102a and the reverse rotation of the motor started upon detection of the external force larger than the predetermined value by the window frame sensor in step 104a. Even in this case there can be obtained the same effect.

Figure 3C:
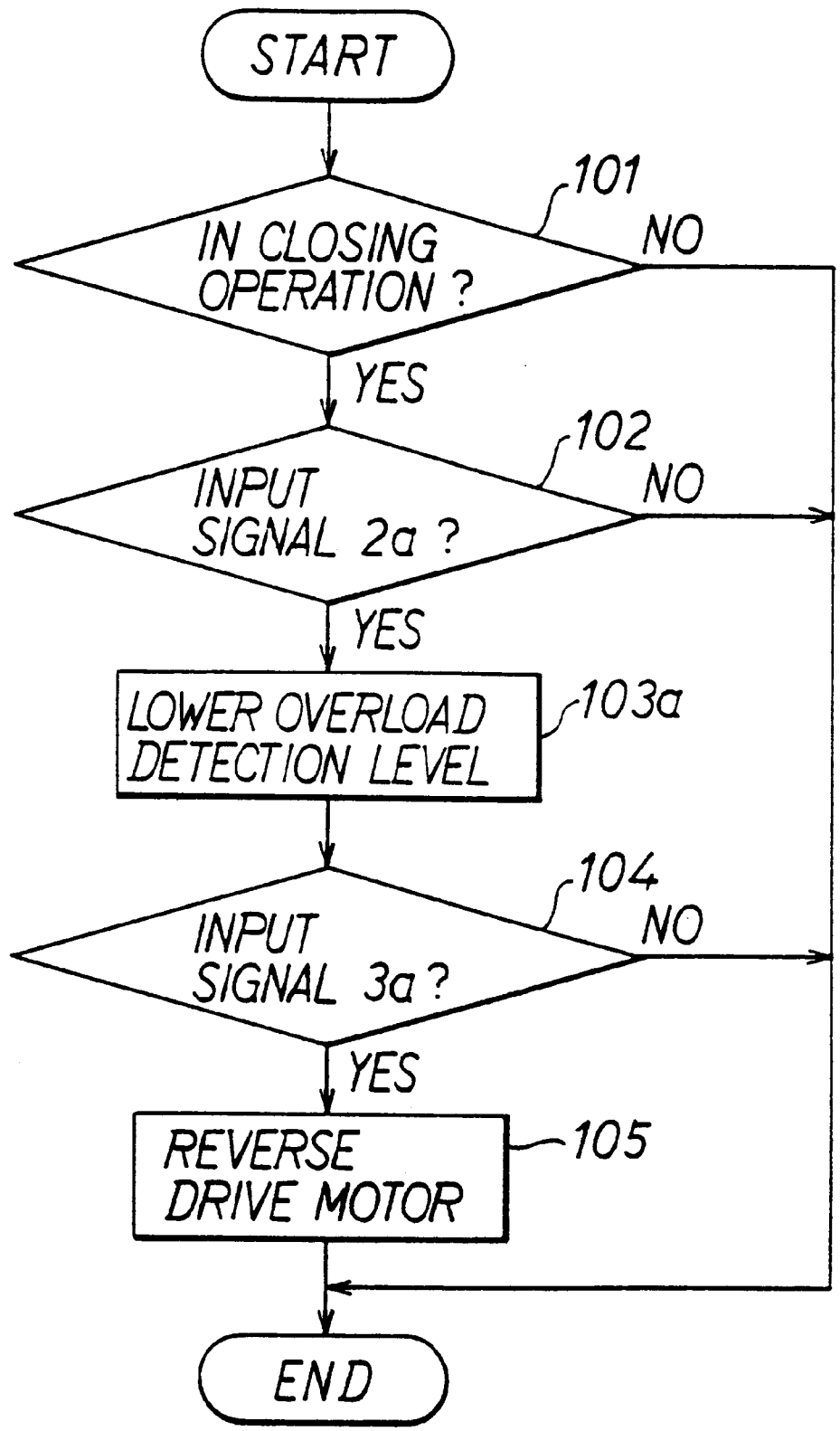

Moreover, as shown in FIG. 3C, the motor overload detection level may be lowered in step 103a (that is, the set value of rotation in the overload detection by the rotation sensor 31 may be raised) in place of decelerating the drive motor upon detection of the external force larger than the predetermined value by the window frame sensor. Even in this case there will be no change in the effect obtained.

Further, in place of or together with the deceleration of the drive motor upon detection of an external force larger than the predetermined value by the window frame sensor or upon detection of an overload of the motor, a warning lamp may be turned on or a warning sound may be issued.

(Third Embodiment)

FIG. 5 is a partial schematic view of the third embodiment of the present invention for an explanation of an object of the third and fourth embodiments of the present invention.

In FIG. 5, the power window illustrated therein comprises window frame sensors 21 and 22, e.g., tape switch, disposed at the peripheral edge of a window frame for sensing an external force and a drive motor 3. When the external force sensed by the window frame sensor 21 or 22 has exceeded a predetermined value and the load of the drive motor 3 also exceeded another predetermined value, it is regarded that a foreign matter is caught in between a window glass 12 and a window frame 11, and the closing operation of the power window is stopped.

The window frame sensors 21 and 22, based on the structure thereof, senses an external force on the basis of an external force component (the force exerted on the window glass) F1 which is orthogonal to the window frame 11 (window frame sensors 21 or 22), out of an external force F0 exerted on the foreign matter (window frame), and out of the force F1 it is a force component F3 acting in the direction of closing operation of the window glass 12 that the drive motor receives as a load.

Consequently, the smaller the angle between the closing direction of the window glass 12 and the window frame 11, the smaller the force F3 which the drive motor 3 receives as a load, even if the magnitude of the external force F0 working on the foreign matter (the window frame) is the same.

Further, in the area where an angle between the closing direction of the window glass 12 and the window frame 11 is small, the force F3 received as a load becomes smaller, so that it becomes difficult to make distinction between a detection error range in the detected load of the drive motor and a variation range of load caused by insertion of a foreign matter. As a result, the percentage of the detection error in the detected load becomes larger.

Therefore, if a foreign matter is caught in a position where the angle between the closing direction of the window glass 12 and the window frame 11 is small, a malfunction such that a certain position even with a foreign matter caught therein does not cause discontinuance of the closing operation of the power window because the percentage of the detection error in the detected load becomes larger.

In view of the above point, an object of the third and fourth embodiments of the present invention is to reduce the occurrence of a malfunction of a power window irrespective of a position of a window frame wherein a closing operation of a window body such as window glass is stopped upon sensing a foreign matter stuck between the window frame and the window glass.

Figure 6:
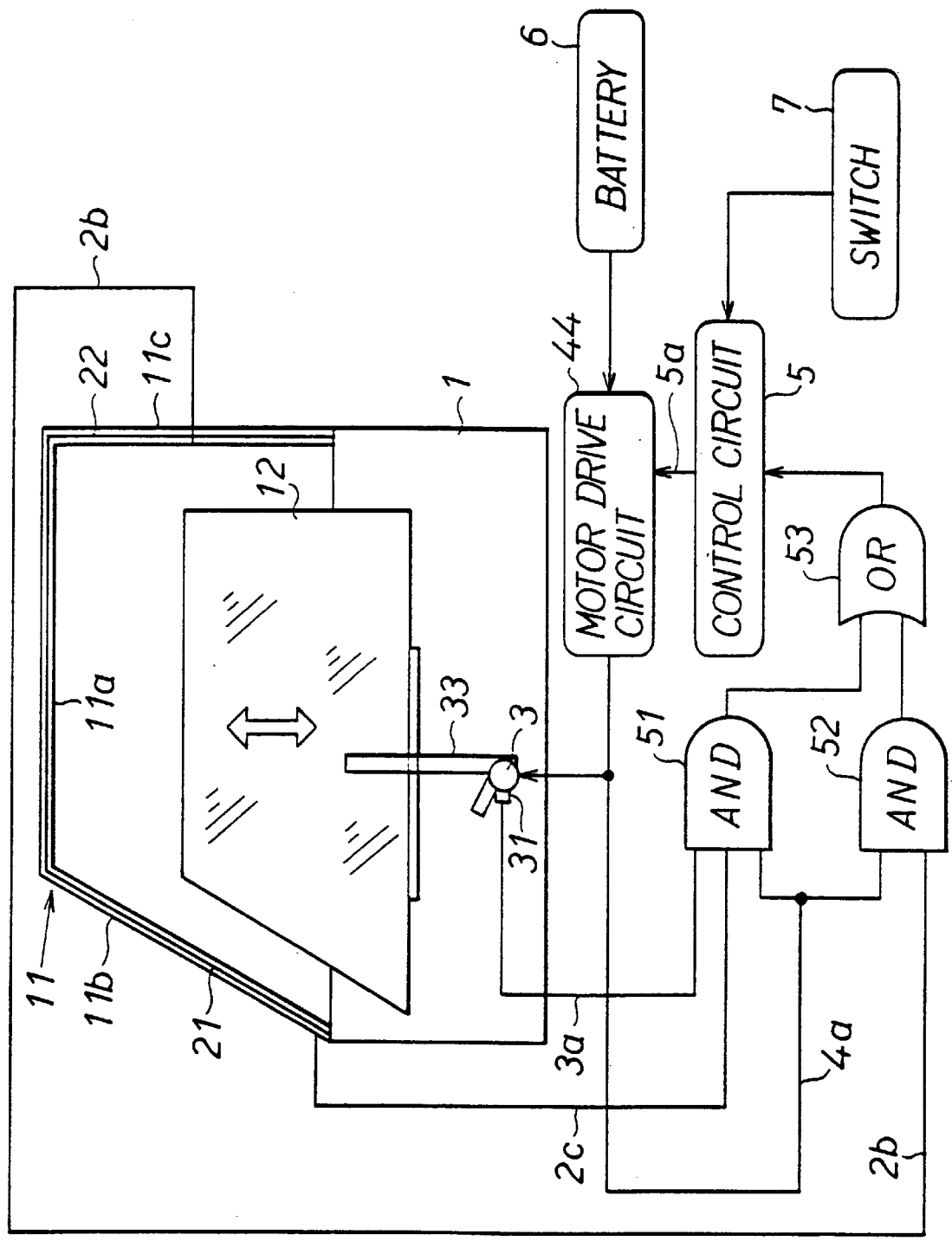
FIG. 6 is a block diagram of a power window according to the third embodiment.

FIG. 6 shows a block diagram of a power window according to the third embodiment. In FIG. 6, a drive motor 3 for moving a window glass 12 up and down is provided in a vehicular door 1. The window glass 12 is moved up and down through a regulator 33 which transmits the driving force of the drive motor 3 to the window glass 12.

Forward and reverse rotations of the drive motor 3 are performed by changing a voltage polarity to a motor terminal in a motor drive circuit 44. An overload signal 3a provided from the drive motor 3 is fed to an AND gate 51. The overload signal 3a is generated when a detected value from a rotation sensor 31 attached to the drive motor 3 has dropped below a predetermined value. A window frame sensor 21 is disposed along a window frame 11 of the vehicular door 1, extending from an upper side 11a to a front side 11b of the inner peripheral edge of the window frame 11. A window force signal 2c provided from the window sensor 21 is fed to the AND gate 51. Further, a window frame sensor 22 is disposed along the inner peripheral edge of a rear side 11c, and a window force signal 2b provided from the window frame sensor 22 is fed to an AND gate 52.

For example, the window frame sensors 21 and 22 each comprises a flexible, insulating rubber tube and a pair of electrodes made of an electrically conductive rubber and extending in the longitudinal direction of the tube in opposed positions on the inner peripheral surface of the tube. When an external force of a predetermined value (hereinafter referred to as the "sensing level") or stronger is applied to the rubber tube, the tube is deformed and the opposed electrodes come into contact and conduction with each other to generate an output signal.

In this embodiment there are used two types of window frame sensors 21 and 22, the sensing level of the sensor 21 being larger than that of the sensor 22. Both window frame sensors 21 and 22 may be conformed in the sensing level and in this case it is desirable that the sensing level is conformed to the lower level of the window frame sensor 22.

The angles between the positions where the window frame sensors 21 and 22 are disposed and the direction of vertical movement of the window glass 12 are different. The angle of the upper and front sides 11a, 11b where the window frame sensor 21 is disposed relative to the direction of vertical movement of the window glass 12 is larger than a predetermined angle. On the other hand, the angle of the rear side 11c where the window frame sensor 22 is disposed relative to the direction of vertical movement of the window glass 12 is not larger than the predetermined angle. The predetermined angle is determined in consideration of a detection error occupied in the overload signal 3a as described above.

A window-closing ON signal 4a is fed to the AND gates 51 and 52. The signal 4a is generated, for example, when the motor is in forward rotation (in the closing direction of the window glass 12) in accordance with the polarity at the motor terminal.

Output signals from the AND gates 51 and 52 are fed to an OR gate 53, and an output signal 5a from the OR gate 53 is fed to a control circuit 5. The control circuit 5 causes the motor drive circuit 44 to operate in accordance with a command provided from an operating switch 7. The motor drive circuit 44 switches from one to the other the polarity of a DC voltage provided from a battery 6 and then applies the voltage to the drive motor 3 to rotate the drive motor 3 forward or reverse.

Upon input of the output signal from the OR gate 53 the control circuit 5 provides the command signal 5a to the motor drive circuit 44 to rotate the drive motor 3 in a reverse direction (in the opening direction of the window glass), whereby it is possible to prevent a foreign matter from being caught in the window glass 12.

As is seen in FIG. 6, the rear side 11c of the window frame 11, in comparison with the upper and front sides 11a, 11b, is smaller in the working angle which is the angle between the vertical moving direction of the window glass 12 and the window frame 11, so that the force (F3) which the drive motor 3 receives as a load is small, as mentioned above with reference to FIG. 5. Consequently, it becomes difficult to distinguish between a detection error range of a detected load of the drive motor 3 and a load variation range based on sticking of a foreign matter, with increase in the proportion of detection error in the detected load.

According to this embodiment, however, once the window force signal 2b is produced from the window frame sensor 22 disposed on the rear side 11c having a small working angle, it is regarded that the sticking of a foreign matter has occurred in the region not larger than the foregoing predetermined angle, and the foreign matter sticking is determined on the basis of the window force signal 2b provided from the window frame sensor 22 without taking the overload signal 3a into account. Therefore, the determination in question is free from error. Thus, as compared with the case where the determination is made on the basis of a signal with a large proportion of detection error occupied therein, the foreign matter sticking determination becomes more certain and the occurrence of a malfunction such as, for example, the window closing operation being not stopped even with a foreign matter caught in the window glass is decreased.

On the upper side 11a and front side 11b of the window frame 11 which are large in the working angle, the determination of foreign matter sticking is made on the basis of two signals—the overload signal 3a and the window force signal 2c from the window frame sensor 21—, so that the determination in question can be done with certainty.

(Fourth Embodiment)

Figure 7:
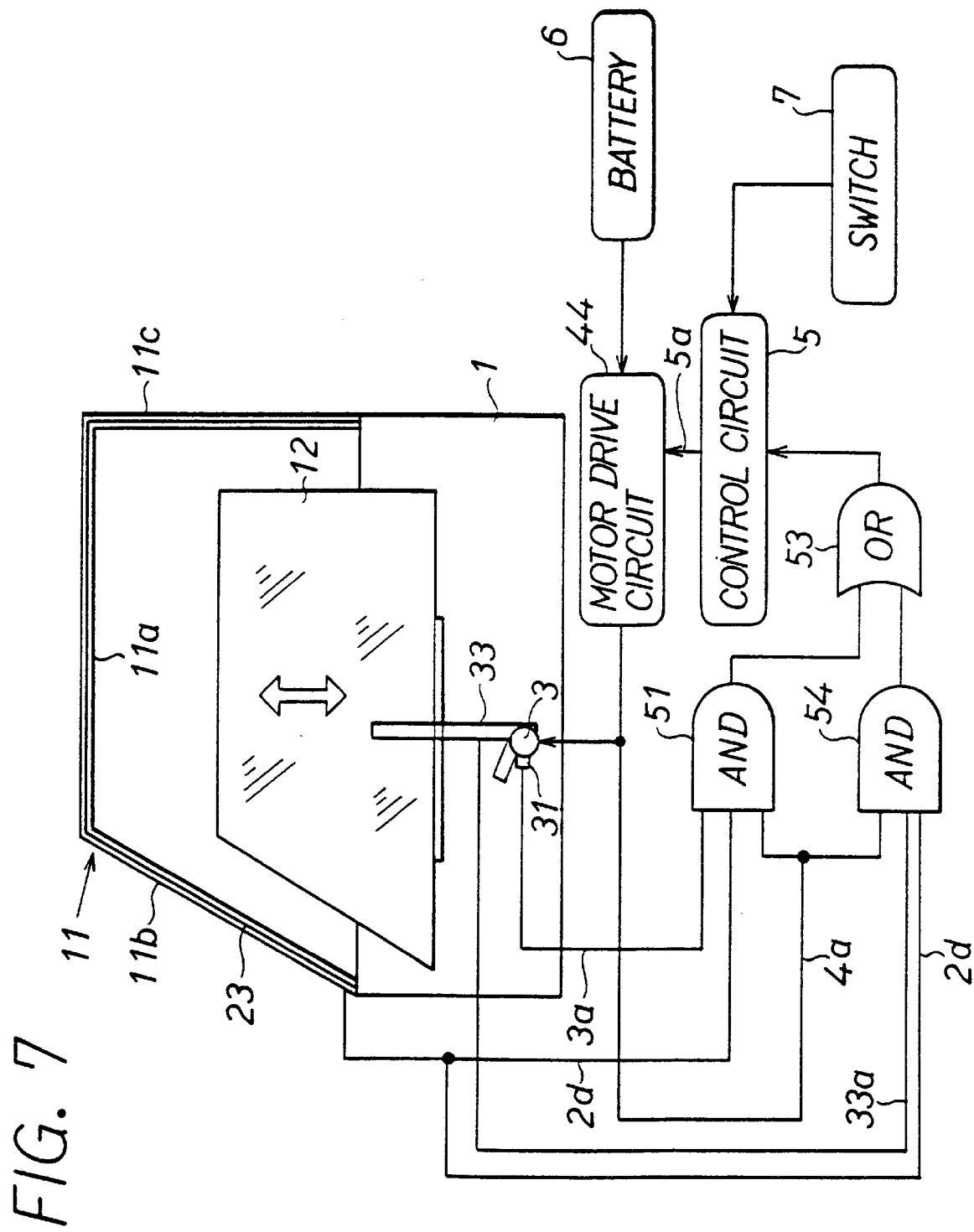
FIG. 7 is a block diagram of a power window according to the fourth embodiment of the present invention.

FIG. 7 is a block diagram of a power window according to the fourth embodiment of the present invention. According to this fourth embodiment, determination as to whether the working angle of a position where an external force on a frame window sensor exceeds a predetermined value is within the region lower than the foregoing predetermined angle or not, is made on the basis of the position of the window glass 12.

In FIG. 7, a single window frame sensor 23 is disposed over the three sides—upper side 11a, front side 11b and rear side 11c—of a window frame 11, and a window force signal 2d from the window frame sensor 23 is fed to an AND gate 51 together with an overload signal 3a and a window-closing ON signal 4a.

Further, the window force signal 2d from the window frame sensor 23 is fed to an AND gate 54 together with a position signal 33a provided from a regulator 33 as a detected signal of the position of the window glass. Output signals from both AND gates are fed to an OR gate 53 as in the first embodiment. The position signal 33a is issued when the window glass 12 is located at a predetermined position or lower, that is, when the working angle is not larger than a predetermined angle.

In the above construction, when the window force signal 2d is issued from the window frame sensor 23 and the position signal 33a also issued, it is regarded that the sticking of a foreign matter has occurred in a region of a predetermined angle or less, and the foreign matter sticking is determined on the basis of the window force signal 2d provided from the window frame sensor 23 without taking the overload signal 3a into account.

On the other hand, when the window force signal 2d is issued from the window frame sensor 23 and the position signal 33a not issued, it is regarded that the sticking of a foreign matter has occurred in a region exceeding the predetermined angle, and the foreign matter sticking is determined on the basis of the overload signal 3a and the window force signal 2d provided from the window frame sensor 23. Thus, since there are performed operations similar to those in the previous embodiment, the determination in question becomes certain and a malfunction such as, for example, the window closing operation being not stopped even with a foreign matter caught in the window glass is diminished.

Although in this embodiment there is used a single window frame sensor 23, there may be used a plurality of window frame sensors equal in the sensing level.

The detection of an overload of the drive motor 3 can also be made by detecting a motor torque or a motor current.

The window frame sensor 2 may be substituted by a pressure sensor or the like. For example, there may be used a pressure sensor which produces an output signal proportional to the magnitude of an external force, and in this case, when the output signal has exceeded a predetermined value, this is detected by a control circuit 5.

Moreover, plural window frame sensors of different sensing levels may be combined into a single window frame sensor.

As the position signal 33a there may be used a position signal obtained by detecting a rotation pulse of the drive motor 3 or a reduction gear meshing with the drive motor 3.

Further, the present invention is also applicable to a power window having a window glass whose vertical movement involves a rotating motion.

Although the present invention has been fully described in connection with preferred embodiments thereof with reference to the accompanying drawings, it is to be noted that various changes and modifications are apparent to those skilled in the art. Such changes and modifications are to be understood as being included within the scope of the present invention as defined in the appended claims.

What is claimed is:

1. A power window comprising:

a window frame having at least one vertical inner peripheral edge that is approximately vertical;

a window body movably disposed within said window frame;

sensing means disposed along said vertical inner peripheral edge of said window frame for sensing external force and outputting a window force signal when said external force exceeds a first predetermined value;

window body driving means for driving said window body;

operation detecting means for detecting a closing operation of said window body and outputting a window closing signal while said closing operation is detected; and control means which provides a command signal to said window body driving means to stop said closing operation of said window body upon receiving said window closing signal and said window force signal.

2. A power window according to claim 1, wherein:

said vertical inner peripheral edge is along a driving direction of said window body.

3. A power window comprising:

a window frame having an inner peripheral edge;

a window body movably disposed within said window frame;

sensing means installed along said inner peripheral edge of said window frame for sensing external force and outputting a window force signal when said external force exceeds a first predetermined value;

window body driving means for driving said window body;

load detecting means for detecting a drive load of said window body driving means and outputting an overload signal when said drive load exceeds a second predetermined value;

operation detecting means for detecting a closing operation of said window body and outputting a window closing signal while said closing operation is detected; and control means which provides a command signal to said window body driving means to stop said closing operation of said window body upon receiving said window closing signal and said window force signal when a working angle between a position of said window frame on which said external force is exerted and a direction of closing said window body is less than a predetermined working angle, and further provides said command signal to said window body driving means to stop said closing operation of said window body upon receiving said window closing signal and said overload signal when said working angle is greater than said predetermined working angle.

4. A power window according to claim 3, wherein:

said inner peripheral edge further includes at least one vertical inner peripheral edge that is approximately vertical; and said sensing means is installed along said vertical inner peripheral edge of said window frame.

5. A power window according to claim 3, wherein:

said inner peripheral edge further includes a portion which is along a driving direction of said window body; and said sensing means is installed along said portion of said inner peripheral edge.

6. A power window according to claim 3, further comprising:

window body position detecting means for detecting a position of said window body, wherein:

said working angle is determined by said position of said window body detected by said window body position detecting means.

7. A power window comprising:

a window frame having an inner peripheral edge;

a window body movably disposed within said window frame;

sensing means installed along said inner peripheral edge of said window frame for sensing external force and outputting a window force signal when said external force exceeds a first predetermined value;

window body driving means for driving said window body;

load detecting means for detecting a drive load of said window body driving means and outputting an overload signal when said drive load exceeds a second predetermined value; and control means which provides a command signal to said window body driving means to stop closing said window body when said window force signal is received from said sensing means during a closing operation of said window body, and further provides said command signal to said window body driving means to stop closing said window body when said overload signal is received from said load detecting means during a closing operation of said window body.

8. A power window according to claim 7, wherein:

said inner peripheral edge further includes at least one vertical inner peripheral edge that is approximately vertical; and said sensing means is installed along said vertical inner peripheral edge of said window frame.

9. A power window according to claim 7, wherein:

said inner peripheral edge further includes a portion which is along a driving direction of said window body; and said sensing means is installed along said portion of said inner peripheral edge.

* * * * *